US008019050B2

(12) United States Patent
Mactavish et al.

(10) Patent No.: US 8,019,050 B2
(45) Date of Patent: Sep. 13, 2011

(54) METHOD AND APPARATUS FOR PROVIDING FEEDBACK OF VOCAL QUALITY TO A USER

(75) Inventors: Thomas J. Mactavish, Inverness, IL (US); Robert M. Gardner, Gilbert, AZ (US)

(73) Assignee: Motorola Solutions, Inc., Schaumburg, IL (US)

( * ) Notice: Subject to any disclaimer, the term of this patent is extended or adjusted under 35 U.S.C. 154(b) by 1229 days.

(21) Appl. No.: 11/619,256

(22) Filed: Jan. 3, 2007

(65) Prior Publication Data

US 2008/0162120 A1 Jul. 3, 2008

(51) Int. Cl.
*H04M 1/24* (2006.01)

(52) U.S. Cl. ................ 379/22.08; 379/392.01; 455/570; 455/569.2; 455/114.2; 455/296; 455/278.1; 381/86

(58) Field of Classification Search ......... 379/3, 406.01, 379/406.02, 406.03, 392.01, 22.08, 88.01; 455/570, 569.2, 114.2, 222, 278.1, 283, 296; 381/86
See application file for complete search history.

(56) References Cited

U.S. PATENT DOCUMENTS

| | | | | |
|---|---|---|---|---|
| 4,829,565 | A * | 5/1989 | Goldberg | 379/390.01 |
| 6,151,391 | A | 11/2000 | Sherwood | |
| 6,674,865 | B1 | 1/2004 | Venkatesh | |
| 6,888,935 | B1 * | 5/2005 | Day | 379/202.01 |
| 6,889,064 | B2 * | 5/2005 | Baratono et al. | 455/569.2 |
| 7,006,845 | B2 * | 2/2006 | Simon | 455/553.1 |
| 7,023,984 | B1 * | 4/2006 | Short et al. | 379/388.03 |
| 2004/0213402 | A1 * | 10/2004 | Ruetschi | 379/388.06 |
| 2004/0260547 | A1 * | 12/2004 | Cohen et al. | 704/233 |
| 2005/0213745 | A1 * | 9/2005 | Thomasson | 379/388.01 |
| 2008/0101557 | A1 * | 5/2008 | Boss et al. | 379/88.08 |
| 2008/0108306 | A1 * | 5/2008 | Yee | 455/41.2 |

* cited by examiner

*Primary Examiner* — Olisa Anwah
(74) *Attorney, Agent, or Firm* — Terri S. Hughes

(57) ABSTRACT

Embodiments of the invention relate to a feedback mechanism that informs a user of a communication device to adjust the volume, pitch, tone or other characteristic of his voice so as to compensate for noise in the surrounding environment. The feedback mechanism includes feedback circuitry that analyzes audio signals from the microphone and preferably from one or more additional environmental noise sensors. From the analysis, the feedback circuitry determines characteristics of the user's voice and characteristics of the environmental noise, and provides an analysis of how the user might modify his voice to best compensate for environmental noise. This analysis results in an indication to the user, such as through a vibration, a sound, or graphical indication on the device, which tells the user whether and to what extent the user should adjust a characteristic of his voice to best overcome such environmental noise.

16 Claims, 3 Drawing Sheets

METHOD AND APPARATUS FOR PROVIDING FEEDBACK OF VOCAL QUALITY TO A USER

FIELD OF THE DISCLOSURE

The subject matter of the present disclosure relates to a method and apparatus to provide a user of a communication device with feedback indicating the quality of the user's voice relative to environmental noise and how characteristics of the user's voice can be changed to improve the quality.

BACKGROUND OF THE DISCLOSURE

People use voice receptive devices, such as wireless phones or voice recognition devices, in a variety of environments-some of which may have relatively high levels of environmental noise. When the device is used in a noisy environment, the person speaking may not be capable of properly gauging the volume, tone, or pitch of his voice provided to the device. If the device is a wireless phone, for example, the user's voice may be too loud for the listener on the other end of a call, or the listener may not be able to understand what is being said if the user's voice is too soft. If the device is capable of voice recognition, for example, the voice commands provided by the user to the device may not be processed properly because the user's voice is not at an optimal range in its characteristics for processing.

The subject matter of the present disclosure is directed to overcoming, or at least reducing the effects of, one or more of the problems set forth above.

BRIEF DESCRIPTION OF THE FIGURES

Various embodiments of the disclosure are now described, by way of example only, with reference to the accompanying figures, in which.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It is further appreciated that certain actions and/or steps may be described or depicted in a particular order of occurrence while those skilled in the art will understand that such specificity with respect to sequence is not actually required. It is also understood that the terms and expressions with respect to their corresponding respective areas of inquiry and study except where specific meaning have otherwise been set forth herein.

DETAILED DESCRIPTION OF THE DISCLOSURE

Embodiments of the disclosure relate to a feedback mechanism that informs a user of a communication device (e.g., a phone or other telephony arrangement) to adjust the volume, pitch, tone or other characteristic of his voice so as to compensate for noise in the surrounding environment. The feedback mechanism includes feedback circuitry that analyzes audio signals from the microphone and preferably from one or more additional dedicated environmental noise sensors. From the analysis, the feedback circuitry determines characteristics of the user's voice and characteristics of the environmental noise, and provides an analysis of how the user might modify his voice to best compensate for the environmental noise. This analysis results in an indication to the user, such as through a vibration, a sound, or graphical indication on the device, which tells the user whether and to what extent the user should adjust a characteristic of his voice to best overcome such environmental noise. Let us now refer to the figures to describe the disclosure in greater detail.

Figure 1A:
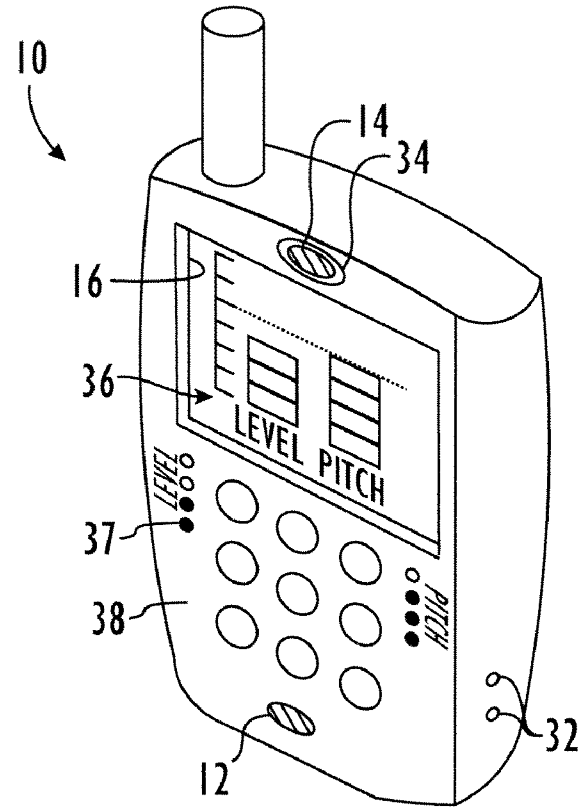
FIG. 1A illustrates one embodiment of a communication device having a feedback mechanism in accordance with an embodiment of the disclosure.
Figure 1B:
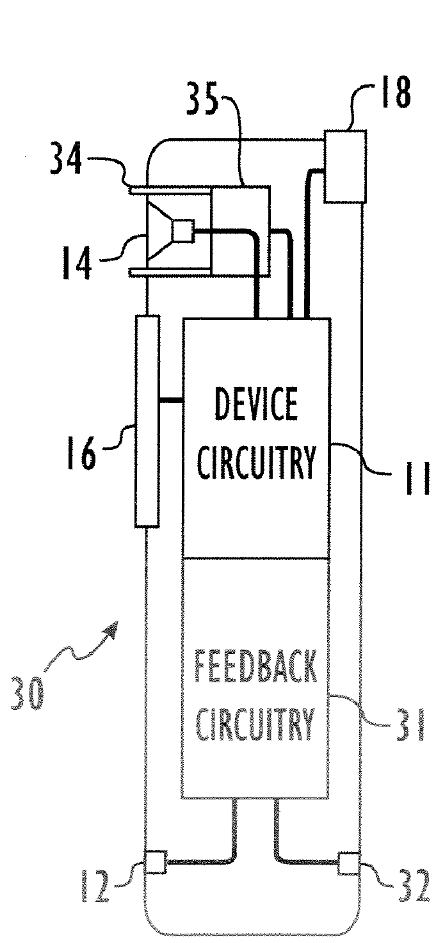
FIG. 1B illustrates a schematic side view of the communication device of FIG. 1A in accordance with an embodiment of the disclosure.

FIGS. 1A and 1B illustrate one embodiment of a device 10 having a feedback mechanism 30 in accordance with one embodiment of the disclosure. In general, the device 10 can be a cellular telephone, an in-vehicle communication device such as a Telematics system, or any other communication device. In addition, the device 10 can be a home set-top box or any of the various devices equipped to recognize speech or respond to voice commands.

The device 10 has device circuitry 11, a microphone 12, a speaker 14, and a display 16. If the device 10 is a cellular telephone, for example, the device circuitry 11 can be conventional wireless phone electronics, which are not discussed in detail herein. The device circuitry 11 may provide automatic gain control using techniques known in the art for filtering out environmental noise from the received audio signal and for performing echo-cancellation. Furthermore, the device circuitry 11 may also generate a sidetone that feeds a small amount of the audio signal picked up by the microphone 12 back to the internal speaker 14 so that the person using the device 10 can hear an amplified version of his own voice. Such sidetones can be generated using techniques disclosed in U.S. Pat. No. 6,151,391, which is incorporated herein by reference.

As alluded to above, the feedback mechanism 30 informs a user of the device 10 to adjust the volume, pitch, tone or other characteristic of his voice to compensate for environmental noise. The feedback mechanism 30 includes feedback circuitry 31 that is coupled to or is part of the device circuitry 11. The feedback circuitry 31 analyzes audio signals from the microphone 12, and preferably one or more additional noise sensors 32 (explained further below). From the analysis, the feedback circuitry 31 compares characteristics of the user's voice and the characteristics of the environmental noise, and makes an assessment as to how the user can most logically tailor the characteristics of his voice in light of the environmental noise. The result of this assessment is provided to the user through at least one of a variety of indications, such as through a vibration, a sound, or graphical indication on the device. Preferably, the indication tells the user whether and to what extent the user should adjust a characteristic of his voice to best overcome problems caused by noise in the environment. For example, the indication might tell the user to speak more loudly or softly, or to adjust his pitch to higher or lower frequencies.

Figure 2:
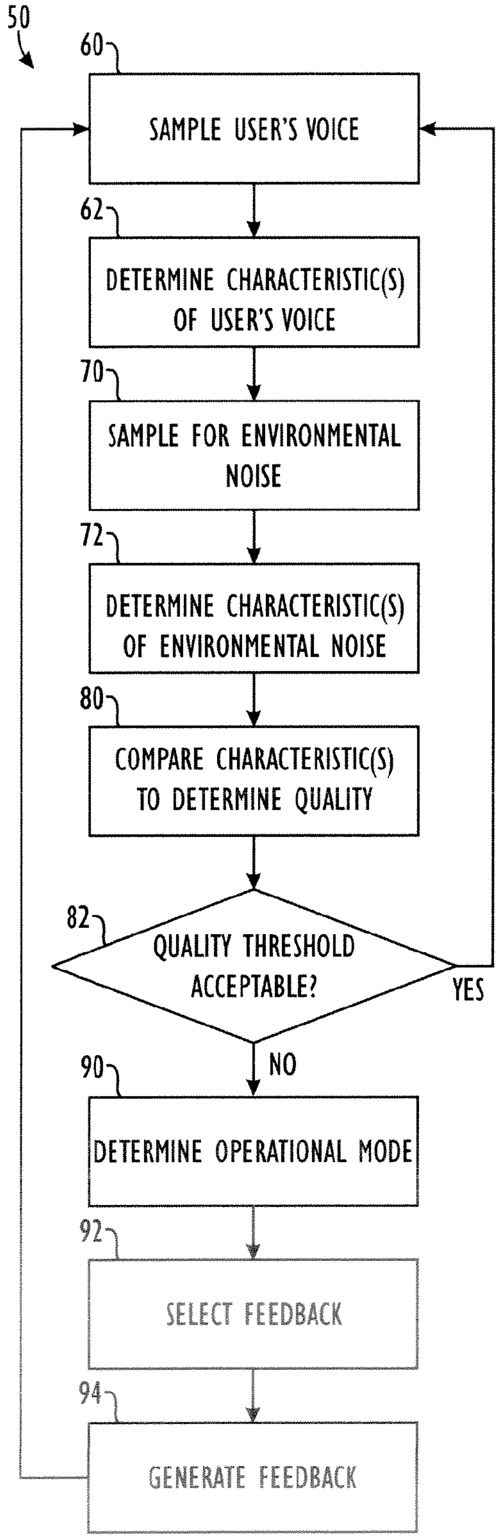
FIG. 2 illustrates one embodiment of the disclosed feedback process in flowchart form in accordance with an embodiment of the disclosure.
Figure 3:
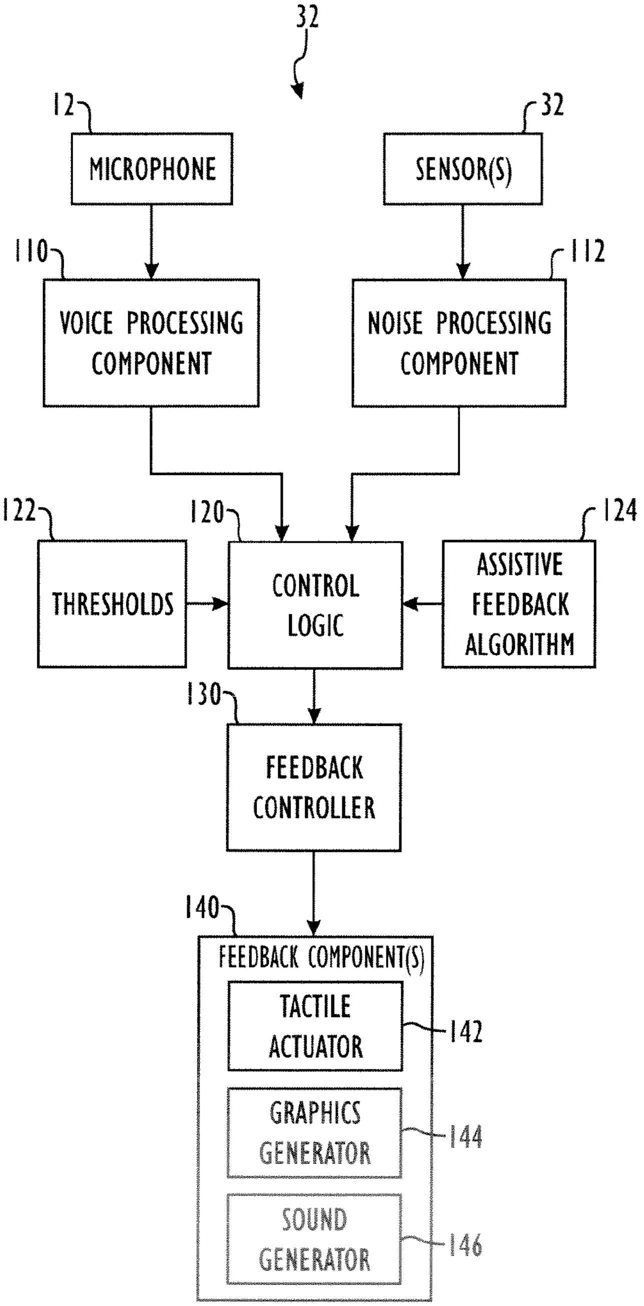
FIG. 3 schematically illustrates components of a feedback mechanism for implementing the process of FIG. 2 in accordance with an embodiment of the disclosure.

A process 50 for such feedback, and the feedback circuitry 31 through which the process can be implemented, are illustrated in FIGS. 2 and 3 respectively. As a first step, the user's voice as received by the microphone 12 is sampled (Step 60), and one or more characteristics of the user's voice (e.g., dB level, frequency, etc.) are determined (Step 62). These steps can be accomplished by a voice processing component 110 (FIG. 3), which can sample and filter the received audio signals using standard audio processing techniques to determine loudness, tone, pitch, etc. of the user's voice. Such voice audio processing is well known in the art, and is not described further.

Next, the environmental noise is sampled (Step 70), and like the user's voice, is analyzed for its characteristics (Step 72). As shown in FIG. 3, environmental noise can be received at the specially-dedicated noise sensors 32, and can be analyzed using a noise processing component 112. However, the receipt and analysis of the user's voice and environment noise can also take place using the same hardware. For example, the microphone 12 can be used to receive both voice and noise, which in turn are processed by a single processing component 110. In this case, the processing component discerns the user's voice from environmental noise, and accordingly samples each during appropriate times. Technology for discerning between active speech and background noise is well known. Alternatively, the same processing component 110 can be used for both voice and noise, but with separate microphone 12 and sensor(s) 32 used to receive the voice and noise respectively. This can assist the technique by allowing for the positioning of sensor(s) 32 on the body of the device 10 away from the user's mouth, as shown in FIG. 1A. The particular positioning of the sensor(s) 32 on the body of the device 10 better ensures that the microphone 12 receives the user's voice while the sensor(s) 32 receives the environmental noise.

The voice characteristics are then compared to the noise characteristics to determine the current quality of the user's voice (Step 80). For example, the dB level of the user's voice can be compared to the dB level of the environmental noise to ascertain the difference; if the difference between the voice and noise is high (e.g., above a certain threshold), then the voice can be considered good quality in relation to the noise. Such a comparison of the voice and noise characteristics can be accomplished via control logic 120, which functions in accordance with predetermined thresholds 122, such as the dB threshold just described as an example. Such thresholds 122 may be adjustable by the user, or may be preset as part of the feedback circuitry 31.

If the comparison to the threshold 122 indicates a good quality (Step 82), then there is no need for the feedback mechanism 30 to provide any sort of indication to the user, and the process 50 returns to sampling, etc. (Step 60). If, however, the comparison to the threshold 122 indicates a poor quality, the assistive feedback algorithm 124 is used by the control logic 120 to determine how the user could alter his voice to improve the situation vis-à-vis the environmental noise.

This algorithmic determination can involve several substeps. For example, the process 50 can assess the current operational mode of the device 10 (Step 90). This is useful because the current operational mode might affect the suggested feedback. For example, if the device 10 is a telephone being used in a hands-free mode, it is not logical for the assistive feedback algorithm 124 to choose a tactile means of indication to the user, such as a vibration; instead an audible indication might be best. By contrast, when the device 10 is positioned in a cradle for hands-free use in a vehicle, graphical instructions might be preferable, etc. In any event, the assistive feedback algorithm 124 takes the operation mode of the device into consideration, and selects an appropriate form of feedback based on the operational mode (Step 92).

Lastly, a feedback controller 130 generates the appropriate form of feedback (e.g., tactile, graphical, audio, or combinations thereof) to inform the user how to best adjust the characteristics of his voice (Step 94). This occurs in conjunction with a feedback controller 130 which receives the feedback instruction from the control logic 120 and activates an appropriate feedback component, such as an actuator 142 (for a tactile indication), a graphics generator 144 (for a visual indication), or a sound generator (speaker) 146 (for an audible indication), or combinations of these.

The feedback provided to the user by the feedback mechanism 30 as just described can take any different form dependent on whether tactile, graphical, or audible feedback is deemed best. If tactile feedback is chosen, such as a vibration, the feedback controller 130 can activate a vibrating ring 34 and an actuator 35 (see FIGS. 1A and 1B). In the embodiment shown, the vibrating ring 34 encircles the device's speaker 14 so that it positions against the user's ear. The actuator 35 is used to mechanically move the ring 34, and preferably comprises any well-known piezoelectric element. In one embodiment, the intensity and/or pattern of the vibration provided by the actuator 35 and ring 34 can indicate to the user how to change his voice. For example, an intense vibration of the ring 34 may indicate to the user a need to increase the volume of his voice to overcome a large amount of environmental noise. A slow, pulsating vibration of the ring 34 may indicate that a lesser increase in the volume of the user's voice would be optimal. Alternatively, such tactile indications can be used to inform the user to lessen the volume of his voice, to try altering the pitch of his voice to higher or lower frequencies, etc. In alternative embodiments involving tactile feedback, the feedback mechanism 30 can use a temperature changing surface, a conductive plate for electric pulse, a vibration motor, or other tactile alert.

To provide visual feedback to the user, the feedback controller 130 can generate graphics 36 on the display 16 of the device 10 to instruct the user as to how to adjust characteristics of his voice. For example, and as shown in FIG. 1A, the graphics 36 can comprise light bars on the display 16 that show the current loudness and pitch of the user's voice relative to optimal levels. In alternative embodiments, the device 10 can have dedicated visual indicators 37, such as light emitting diodes, to serve the same function, or the housing 38 of the device 10 can be illuminated through any technique, such as quantum dot technology.

To provide audible feedback to the user, the feedback controller 130 can communicate audible instructions to the user by using the internal speaker 14 of the device 10. Alternatively, the feedback controller 130 can send the audible instruction to an interface 18 in communication with an external audio source such as a wireless headset (not shown). The interface and headset may be Bluetooth compliant, as is well known. Alternatively, the interface 18 may be a wired interface for connecting to a wired earpiece and microphone (not shown). In any event, the feedback controller 130 generates a distinct tone, buzzing, or other instructive sound or phrase which can overlay (or which can simply interrupt) the telephone conversation. This audible indication may be diminished and eventually eliminated as the user's voice meets the optimal loudness, pitch, or tone for the environmental noise in question.

Figure 4A:
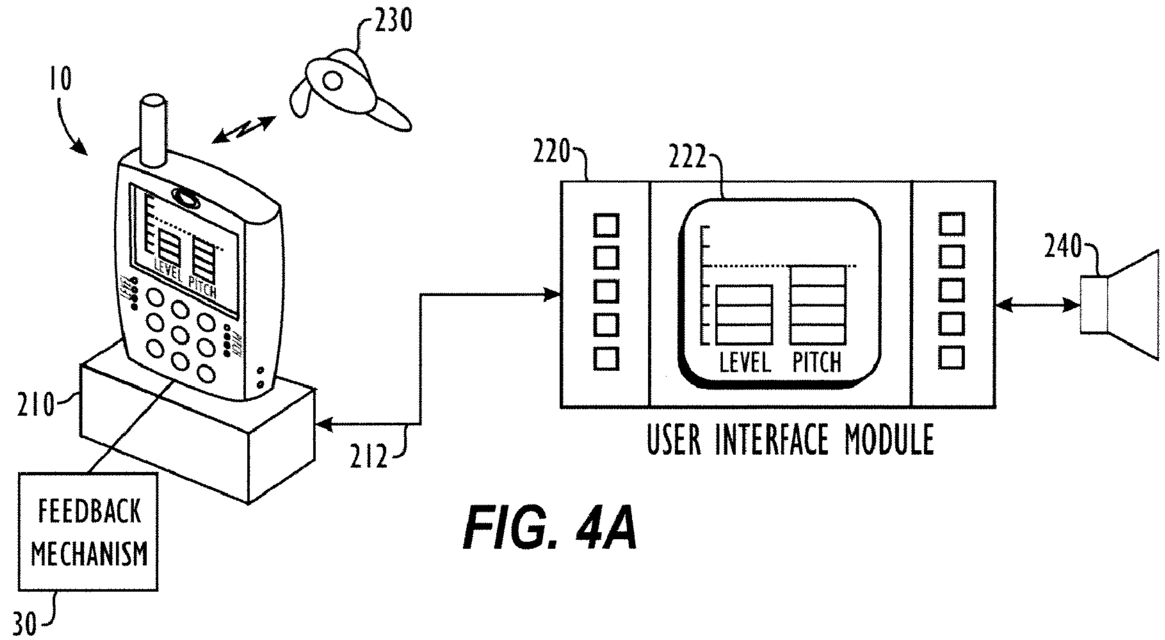
FIGS. 4A and 4B illustrate embodiments of a communication device having a feedback mechanism relative to other devices in accordance with an embodiment of the disclosure.

As discussed briefly above, the disclosed techniques can be used in conjunction with communication devices having auxiliary components. For example, FIG. 4A illustrates use of the disclosed technique in conjunction with a communication device (cellular telephone) 10 having a wireless headset 230 and a user interface module 220. The telephone 10 includes the feedback mechanism 30 as discussed above and can be positioned in a cradle 210 coupled to the user interface module 220 via a wired or wireless connection 212. The user interface module 220 has a display 222 and is coupled to an audio system 240. In one example, the user interface module 220 may be part of a hands-free car kit, a navigation system, or other type of in-vehicle system.

When positioned in the cradle 210, it may not be useful for the telephone 10 itself to provide feedback to instruct the user on how to adjust his voice. Accordingly, the phone 10 can operate in conjunction with one or more of the other devices 220, 230, and 240 to provide appropriate feedback. In one example, the telephone 10 operates in conjunction with the wireless headset 230. The headset 230 receives the user's voice, while the environmental noise is received by (for example) dedicated sensors 34 on the telephone 10 or on the headset 230. Alternatively, the microphone of the headset 230 may be used for both as well. The feedback mechanism 30 processes the audio and provides audible feedback by sending generated sounds to the headset 230 to instruct the user audibly on how to adjust his voice. Alternatively, the feedback mechanism 30 can send the indications to the audio system 240 via the connection 212 or can send a graphical indication to the display 222 of the user interface module 220 to instruct the user visually on how to change his voice characteristics.

Figure 4B:
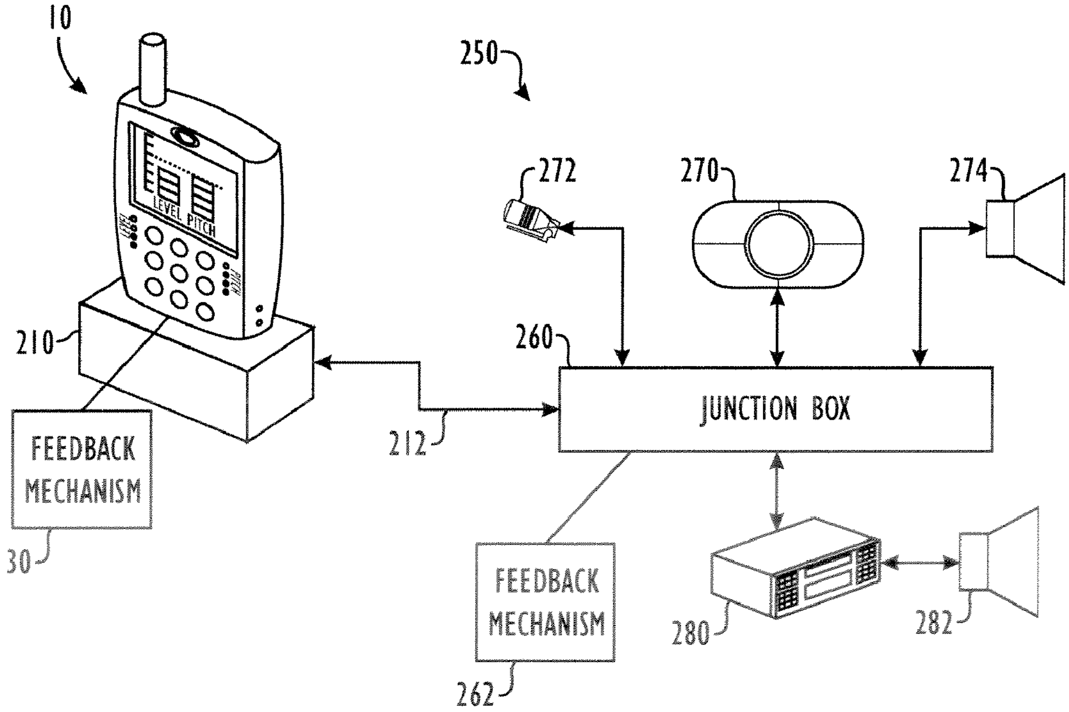

In FIG. 4B, the telephone 10 is shown relative to a hands-free car kit 250 having a Bluetooth-enabled junction box 260, a user interface module 270, a microphone 272, and a speaker 274. The junction box 260 may also be coupled to an in-vehicle audio system 280 that has one or more speakers 282. In one arrangement, the car kit 250 may have its own feedback mechanism 262 while the phone 10 does not. In this arrangement, the car kit 250 takes over the functions of determining, generating, and providing appropriate feedback and simply operates with the phone 10 in a conventional manner. In another arrangement, the phone 10 and the car kit 250 may both have feedback mechanisms 30 and 262, and may share the functions of determining, generating, and providing appropriate feedback.

In yet another arrangement, the car kit 250 may not have its own feedback mechanism and must use the feedback mechanism 30 of the phone 10. In this arrangement, the microphone 272 of the car kit 250 obtains audio signals of the user's voice and environmental sound, and the junction box 260 sends the audio signals to the telephone 10 via connection 212. The feedback mechanism 30 of the telephone 10 determines the adjustment needed for the user's voice and determines what type of feedback (e.g., audible, visual, tactile) to provide based on how the phone 10 is currently being operated (as discussed earlier). To make the determination of the type of feedback to use, the feedback mechanism 30 may determine what type of device it is coupled to using standard techniques, for example, when devices pair in a Bluetooth connection. In this way, the feedback mechanism 30 knows the type of user interfaces of the other device 250.

The phone 10 then returns the appropriate feedback information to the car kit 250, which then implements the feedback. For example, the dedicated speaker 274 or the speaker 282 of the audio system 280 can provide generated sounds for audible instruction, or lights (not shown) on the user interface module 270 can provide visual instruction to the user.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A feedback method for a communication device, comprising:

receiving a user's voice at the communication device;

determining at least one characteristic of the user's voice;

receiving environmental noise at the communication device;

determining at least one characteristic of the environmental noise;

comparing the at least one characteristic of the user's voice with the at least one characteristic of the environmental noise to determine a quality of the user's voice in relation to the environmental noise;

using the comparison, determining an adjustment for the user's voice to improve the quality of the user's voice in relation to the environmental noise;

deciding on the basis of an operational mode of the communication device which of a plurality of indications to provided as an at least one indication of the adjustment to the user; and providing at least one indication of the adjustment to the user, wherein the indication informs the user of how to modify his voice to better improve the quality of the user's voice in relation to the environmental noise.

2. The method of claim 1 wherein the at least one characteristic of the user's voice is selected from a tone, a pitch, or a volume of the user's voice.

3. The method of claim 1, wherein providing the indication is selected from at least one of the following:

actuating a tactile element;

generating a sound; or displaying graphical information.

4. The method of claim 1, wherein the user's voice is received at a first sensor, and wherein the environmental noise is received at a second sensor.

5. The method of claim 1, wherein determining an adjustment for the user's voice comprises comparison of the at least one characteristic of the user's voice and the at least one characteristic of the environmental noise to a threshold.

6. The method of claim 1, wherein the plurality of indications comprises two or more of a tactile indication, an auditory indication, or a graphical indication.

7. A feedback method for a communication device having a communication connection to an auxiliary device, comprising:

receiving a user's voice at the auxiliary device;

determining at least one characteristic of the user's voice at the communication device;

receiving environmental noise at the communication device;

determining at least one characteristic of the environmental noise at the communication device;

comparing the at least one characteristic of the user's voice with the at least one characteristic of the environmental noise to determine a quality of the user's voice in relation to the environmental noise;

using the comparison, determining an adjustment for the user's voice to improve the quality of the user's voice in relation to the environmental noise;

deciding on the basis of an operational mode of the communication device which of a plurality of indications to provide as an at least one indication of the adjustment to the user; and providing at least one indication of the adjustment from the communication device to the auxiliary device, wherein the indication informs the user of how to modify his voice to better improve the quality of the user's voice in relation to the environmental noise.

8. The method of claim 7 wherein the at least one characteristic of the user's voice is selected from a tone, a pitch, or a volume of the user's voice.

9. The method of claim 7, wherein the auxiliary device comprises a headset.

10. The method of claim 7, wherein the communication connection to a headset is wireless.

11. The method of claim 7, wherein the plurality of indications comprises two or more of a tactile indication, an auditory indication, or a graphical indication.

12. The method of claim 7, wherein the auxiliary device comprises a vehicle-based Telematics system.

13. The method of claim 12, wherein the communication connection to the vehicle-based Telematics system is wireless.

14. The method of claim 7, wherein determining an adjustment for the user's voice comprises comparison of the at least one characteristic of the user's voice and the at least one characteristic of the environmental noise to a threshold.

15. A feedback method for a communication device having a communication connection to an auxiliary device, comprising:

receiving a user's voice at the auxiliary device;

determining at least one characteristic of the user's voice at the communication device;

receiving environmental noise at either the communication device or the auxiliary device;

determining at least one characteristic of the environmental noise at the communication device;

comparing the at least one characteristic of the user's voice with the at least one characteristic of the environmental noise to determine a quality of the user's voice in relation to the environmental noise;

using the comparison, determining an adjustment for the user's voice to improve the quality of the user's voice in relation to the environmental noise;

deciding on the basis of an operational mode of the communication device which of a plurality of indications to provide as an at least one indication of the adjustment to the user; and providing at least one indication of the adjustment from the communication device to the auxiliary device, wherein the indication informs the user of how to modify his voice to better improve the quality of the user's voice in relation to the environmental noise.

16. The method of claim 15, wherein the plurality of indications comprises two or more of a tactile indication, an auditory indication, or a graphical indication.

* * * * *